(12) United States Patent
Peintner et al.

(10) Patent No.: US 9,230,014 B1
(45) Date of Patent: Jan. 5, 2016

(54) METHOD AND APPARATUS FOR RECOMMENDING WORK ARTIFACTS BASED ON COLLABORATION EVENTS

(75) Inventors: Bart Peintner, Palo Alto, CA (US); Eric Yeh, Alameda, CA (US); Jing Jung Tien, Sunnyvale, CA (US); Thomas D. Garvey, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 374 days.

(21) Appl. No.: 13/231,457

(22) Filed: Sep. 13, 2011

(51) Int. Cl.
*G06F 17/30* (2006.01)
*H04L 12/58* (2006.01)
*H04L 29/08* (2006.01)

(52) U.S. Cl.
CPC .... *G06F 17/30702* (2013.01); *G06F 17/30699* (2013.01); *H04L 67/22* (2013.01); *H04L 67/30* (2013.01); *H04L 67/36* (2013.01); *H04L 51/12* (2013.01); *H04L 51/32* (2013.01); *H04L 67/02* (2013.01); *H04L 67/10* (2013.01)

(58) Field of Classification Search
CPC .................. G06F 17/30699; G06F 17/30702; H04L 51/12; H04L 51/32; H04L 67/02; H04L 67/10; H04L 67/22; H04L 67/30; H04L 67/36
See application file for complete search history.

(56) References Cited

U.S. PATENT DOCUMENTS

| | | | | |
|---|---|---|---|---|
| 5,974,412 A * | 10/1999 | Hazlehurst et al. | | 1/1 |
| 6,029,195 A * | 2/2000 | Herz | | 725/116 |
| 6,615,208 B1 * | 9/2003 | Behrens et al. | | 707/754 |
| 7,028,020 B1 * | 4/2006 | Keskar et al. | | 1/1 |
| 7,401,131 B2 * | 7/2008 | Robertson et al. | | 709/220 |
| 7,757,170 B2 * | 7/2010 | Billsus et al. | | 715/714 |
| 8,117,197 B1 * | 2/2012 | Cramer | G06F 17/30702 | 706/12 |
| 8,825,759 B1 * | 9/2014 | Jackson | H04L 67/02 | 705/14.69 |
| 8,943,064 B2 * | 1/2015 | Dewar | G06Q 30/02 | 707/736 |
| 2002/0042793 A1 * | 4/2002 | Choi | G06F 17/30687 | 1/1 |
| 2006/0036599 A1 * | 2/2006 | Glaser et al. | | 707/7 |
| 2006/0112105 A1 * | 5/2006 | Adamic et al. | | 707/10 |
| 2007/0118498 A1 * | 5/2007 | Song et al. | | 707/1 |
| 2007/0130145 A1 * | 6/2007 | Pedersen et al. | | 707/9 |
| 2008/0052288 A1 * | 2/2008 | Flinn | G06F 17/30699 | 1/1 |
| 2009/0063132 A1 * | 3/2009 | Miyazaki | G06F 17/30719 | 704/9 |
| 2009/0251457 A1 * | 10/2009 | Walker et al. | | 345/418 |
| 2009/0265330 A1 * | 10/2009 | Cheng et al. | | 707/5 |
| 2010/0030578 A1 * | 2/2010 | Siddique et al. | | 705/3 |
| 2011/0072013 A1 * | 3/2011 | Mosoi et al. | | 707/736 |
| 2011/0173210 A1 * | 7/2011 | Ahn | G06F 17/30616 | 707/748 |
| 2011/0197166 A1 * | 8/2011 | Girgensohn et al. | | 715/846 |
| 2012/0150859 A1 * | 6/2012 | Hu | | 707/737 |
| 2012/0173502 A1 * | 7/2012 | Kumar et al. | | 707/706 |
| 2012/0254099 A1 * | 10/2012 | Flinn | G06F 17/27 | 706/52 |
| 2014/0229164 A1 * | 8/2014 | Martens et al. | | 704/9 |

* cited by examiner

*Primary Examiner* — Patrice Winder
*Assistant Examiner* — Angela Widhalm
(74) *Attorney, Agent, or Firm* — Moser Taboada

(57) ABSTRACT

A method and apparatus for recommending artifacts based on collaboration events in a collaborative environment comprising inferring, based on dynamic interaction, a group of close collaborators for a current user from at least one collaboration event, suggesting relevant artifacts based on one or more interaction patterns of the inferred group of close collaborators and grouping the suggested relevant artifacts into one or more high-level explanations for the current user based on the at least one collaboration event.

16 Claims, 3 Drawing Sheets

METHOD AND APPARATUS FOR RECOMMENDING WORK ARTIFACTS BASED ON COLLABORATION EVENTS

GOVERNMENT RIGHTS IN THIS INVENTION

This invention was made with U.S. government support under contract number FA8750-09-D-0183. The U.S. government has certain rights in this invention.

BACKGROUND

1. Field

Embodiments of the present invention generally relate to task software, and, more particularly, to a method and apparatus for recommending work artifacts based on collaboration events.

2. Description of the Related Art

In collaborative environments, diverse groups of people contribute to an expanding pool of resources in a largely unstructured and un-curated manner. The resulting information overload makes it difficult for a user to locate relevant items and stay informed of relevant changes made by others. Standard approaches to finding relevant items and changes, such as search, browsing, rule-based filters and recent items lists, have limitations in collaborative environments. In collaboration systems (such as wikis, task managers, and Sharepoint) there is a critical need to find task-relevant artifacts (e.g., documents, webpages, and project files). This information retrieval process is more challenging in collaborative than non-collaborative environments for several reasons: (1) a large number of contributors leads to an overwhelming number of resources, (2) many resources are made available to all users but only interest a small fraction of users, and (3) the content is difficult to curate, resulting in out-of-date items and many duplicated-then-slightly-changed items, which obscures the true items of interest.

Successful browsing requires familiarity with the navigational hierarchy of the item or topic, and even this presupposes that the navigation hierarchy was designed appropriately. Browsing quickly breaks down in large repositories, the likes of which are often characteristic of an active collaborative environment with multiple contributors. Rules-based filtering requires users to describe and anticipate ahead of time the type of items that would potentially be important. User studies with Task Assistant, disclosed in U.S. patent application Ser. No. 12/476,020, which is hereby incorporated by reference in its entirety, have shown that users are poor at judging ahead of time the kinds of information that they would define as important. Filters are potentially successful when they properly define the characteristics of known items of interest. However, defining unknown items of interest, which are common to collaborative environments, is difficult, if not impossible. Although search is also a powerful means of information retrieval, it requires the user to know something concrete and differentiating about the target item in order to formulate a successful query. The same holds true for items the user is unaware of, which occurs frequently in fast paced collaborative environments.

Most current work in "recommender systems" (i.e., systems that identify information that may be important to a user) focuses on large datasets, where users explicitly rate or otherwise express an interest in items. Examples include movie-review and online shopping sites, which may have thousands of users and millions of ratings or purchase events. These recommender systems focus on intrinsic properties of the items being recommended (e.g., features of movies or products), and the characteristics of the users choices in the system. The techniques used for these systems do not work well for smaller domains, such as for documents that are very specific to an organization, nor do they work for items just recently created, which have few properties beyond a name associated with them Therefore, there is a need in the art for a method and apparatus for recommending more relevant work artifacts in a collaborative environment.

SUMMARY

Embodiments of the present invention relate to a computer implemented method for recommending artifacts in a collaborative environment comprising inferring, based on at least one collaboration event, a group of close collaborators for a current user, suggesting relevant artifacts based on one or more interaction patterns of the inferred group of close collaborators and grouping the suggested relevant artifacts into one or more high-level explanations for the current user based on the at least one collaboration event.

Embodiments of the present invention further relate to an apparatus for recommending artifacts in a collaborative environment comprising a collaboration module for inferring, based on at least one collaboration event, a group of close collaborators for a current, a suggestion module, coupled to the collaborator module, for suggesting relevant artifacts based on one or more interaction patterns of the inferred group of close collaborators and a grouping module, coupled to the suggestion module and the collaboration module, for grouping the suggested relevant artifacts into one or more high-level explanations for the current user based on the at least one collaboration event.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In embodiments of the present invention, activities of a collaborative system user's colleagues heavily influence which documents are relevant to the user. The activities of a user's close collaborators are important in fast-paced environments where contents describing the documents shift rapidly and preclude many content-based recommendation techniques.

Figure 1:
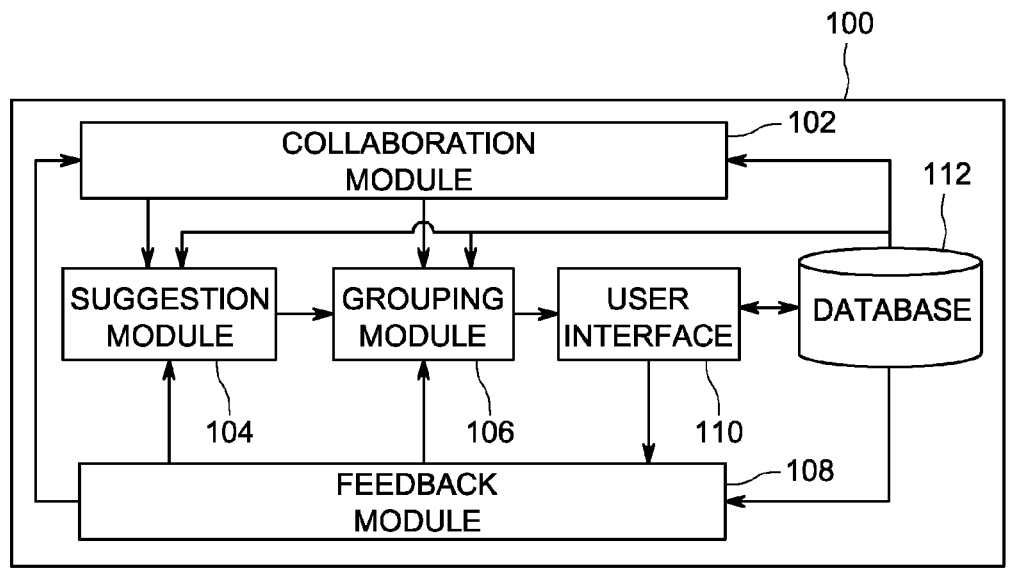
FIG. 1 depicts a functional block diagram of an apparatus for recommending work artifacts based on collaboration events according to an exemplary embodiment of the present invention.

FIG. 1 depicts a functional block diagram of an apparatus 100 for recommending work artifacts based on collaboration events according to an exemplary embodiment of the present invention. The apparatus 100 comprises a collaboration module 102, a suggestion module 104, a grouping module 106, a feedback module 108, a user interface 110 and a database 112. The collaboration module 102 infers a group of close collaborators for a user who is currently connected as a client to the apparatus 100 via a user interface 110. The collaboration module 102 takes into account the different social roles users take in a collaborative environment. The social roles created form identifiable relationships and reoccurring interaction patterns. Initially, there are a set of predefined relation types, for example, manager/subordinate, creator/consumer, colleague, collaboration sender/receiver, group memberships and the like. In an exemplary embodiment, administrators of the apparatus 100 manually set these relationships. In another exemplary embodiment, the relationship types are inferred and continuously updated based on collaborative events, e.g., the relationships are inferred from the interaction of the users with artifacts. The collaboration module 102 infers the close collaborators based on these dynamic collaborative events by different users in the system. For example, each delegation, event increases the degree of one or more relationships between the delegatee and delegator. Thus, an explicit UI mechanism for end users to gather this information is unnecessary, but rather, the information is gathered and maintained unobtrusively. As relationships change over time, so do the inferred relationships as well as the close collaborators inferred by the collaboration module 102.

The suggestion module 104 of the apparatus 100 suggests relevant artifacts based on interaction patterns of the inferred group of close collaborators. An artifact is a task or document created in a sample collaborative system by a user of the system. These artifacts are often assigned to users or shared amongst users as work orders, instructions and the like. Once created, the artifacts are stored in database 112, along with a sequence of user events, the time that separates them, and the relationship between the user and the actor in each event, forming an interaction pattern. For example, if Alice's supervisor, Bob, creates an artifact for a task-list at 2 p.m., and Alice's colleagues, Chris and Dana, each opened the task-list artifact by 3 p.m., then the pattern is "supervisor recently created item, multiple colleagues recently opened item." The interaction pattern in this example is extracted and stored in the database 112, and the suggestion module 104 determines the relevant artifacts to the user and creates a list of such relevant artifacts. The interaction pattern intrinsically encodes the reason for the suggestion. According to an exemplary embodiment, some patterns are universal and are collected using feedback from the generation of the social hierarchy. For example, all users are interested in "Tasks delegated to me." In an exemplary embodiment, an initial set of these universal patterns are instantiated to form a baseline of interaction patterns for a new user.

The suggestion module 104 suggests relevant artifacts based on the close collaborators as well as the collaboration events they generate. The collaboration events are not all of equal importance. For example, if Susan is part of John's close collaborators and Susan views an artifact, it is considered relevant. If susan edits the artifact is considerably more relevant than a viewed artifact and the edited artifact will be weighted differently than the viewed artifact. Similarly, an artifact edited by several close collaborators will be weighted differently than an artifact edited by only one close collaborator or an artifact edited by one close collaborator several times. In this manner, there are distinct classes of collaboration events which have distinct impacts on which artifacts are considered relevant by the suggestion module 104.

In an exemplary embodiment, the suggestion module 104 suggests relevant artifacts to users by taking the user feedback from the feedback module 108, combined with information about user activities, organizational rules and heuristics and generating a set of weightings over the explanations, modeled by an exponential model. A numerical optimizer is then implemented to perform the weighting, which, in exemplary embodiments can run at least one of in a batch mode, online, or the like. According to other exemplary embodiments, other weighting techniques are used, and the present invention does not limit the weighting system.

The grouping module 106 is coupled to the suggestion module 104 as well as the collaboration module 102. The grouping module groups the relevant artifacts suggested by the suggestion module 104, into a groups of explanations for the current user, based on the collaboration events by the user's close collaborators. Thus, artifacts that are suggested based on the same explanation, i.e., "Tasks delegated to me", are under this grouping explanation. In an exemplary embodiment, the relevant artifacts under each explanation have a more specific explanation relating to their relevancy. For example, if the artifact "Tasks for the day" is in the explanation group "Recently Edited by Multiple Contributors," a user is able to view the specific reason that the artifact is included in this group, namely because it was edited by "Susan" who is one of the user's close collaborators.

The feedback module 108 is coupled to the suggestion module 104, the grouping module 106, the user interface 110 and the database 112. The user viewing the user interface 110 makes a determination whether a suggested artifact is in-fact relevant or not. For example, using a UI control, the user triggers the feedback module 108, indicating that a particular group is not relevant. The feedback module 108 reduces the relevancy score of this particular explanation group as corresponding to the user, and stores this score in the database 112. The feedback module further couples with the suggestion module 104 in that the suggestion module now avoids artifacts related to the reduced relevancy explanation group. The grouping module 106 does not show the reduced relevancy explanation group. In another exemplary embodiment, the feedback module 108 is coupled to the collaboration module 102, where users reduce the relevancy score of relationships, causing the collaboration module 102 to weight those relationships less when inferring close collaborators. Each module of the apparatus 100 interacts with the database 112 to produce a grouping of relevant artifacts to a user in the user interface 110.

Figure 2:
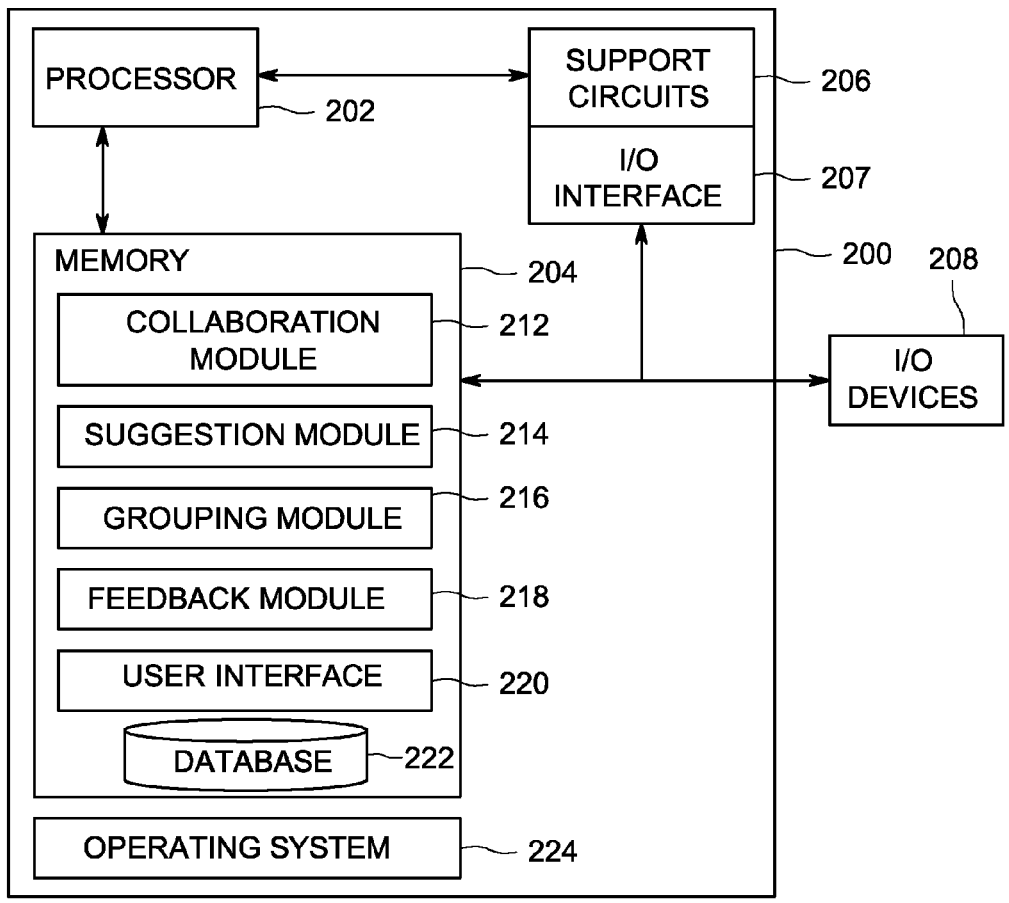
FIG. 2 is a block diagram depicting an exemplary embodiment of a computer system in accordance with one or more aspects of the invention.

FIG. 2 is a block diagram depicting an exemplary embodiment of a computer system 200 in accordance with one or more aspects of the invention. The computer system 200 is used to implement at least a portion of the apparatus 100, namely the collaboration module 102, the suggestion module 104, the grouping module 106, the feedback module 108, the user interface 110 and the database 112. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, I/O interface 207, and the like. The I/O interface 207 may be directly coupled to the memory 204 or coupled through the supporting circuits 206. The I/O interface 207 may also be configured for communication with input devices and/or output devices 208, such as, network devices, various storage devices, mouse, keyboard, displays, sensors and the like.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise a recommendation module 210. According to an exemplary embodiment of the present invention, the recommendation module 210 comprises a collaboration module 212, a suggestion module 214, a grouping module 216, a feedback module 218, a user interface 220 and a database 222. The computer system 200 may be programmed with one or more operating systems (generally referred to as operating system (OS) 224), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 224 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media as described below.

Figure 3:
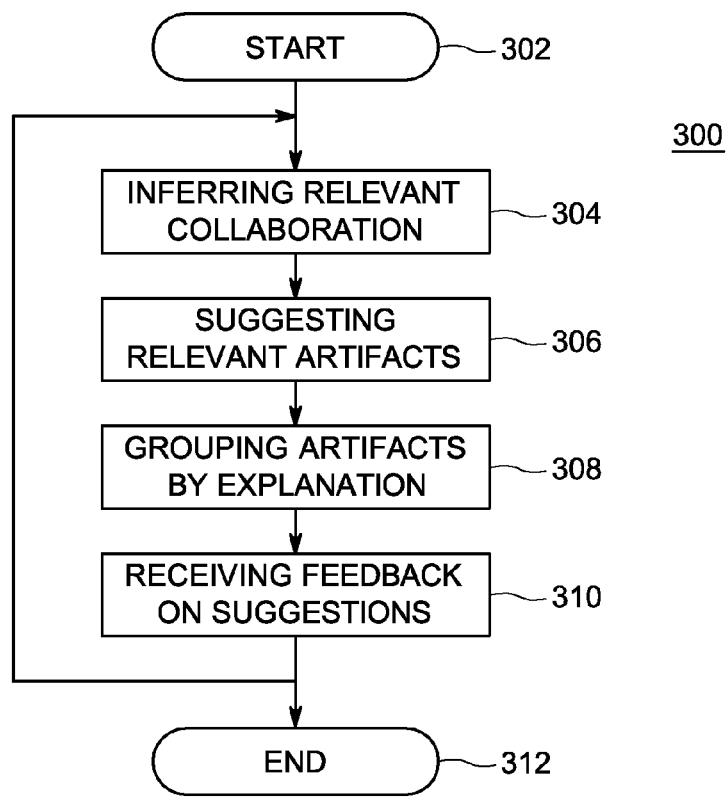
FIG. 3 is a flow diagram of method for recommending work artifacts based on collaboration events according to an exemplary embodiment of the present invention.

FIG. 3 is a flow diagram of method 200 for recommending work artifacts based on collaboration events according to an exemplary embodiment of the present invention. FIG. 3 represents an exemplary implementation of the method for recommending work artifacts by the recommendation module 210, stored in memory 204 and executed by the processor 202. The method 300 begins at step 302 and proceeds to step 304. At step 304, the close collaborators of a user are inferred based on collaboration events in the collaborative environment. At step 306, the group of close collaborators is used to suggest relevant artifacts to a user of the system. At step 308, the relevant artifacts are presented in groups relating to the reason they were suggested. At step 310, the user is able to provide feedback, and that feedback is used to modify the inferred close collaborators (and implicitly, the suggested relevant artifacts) and the grouping of the explanations. The method ends at step 312.

Figure 4:
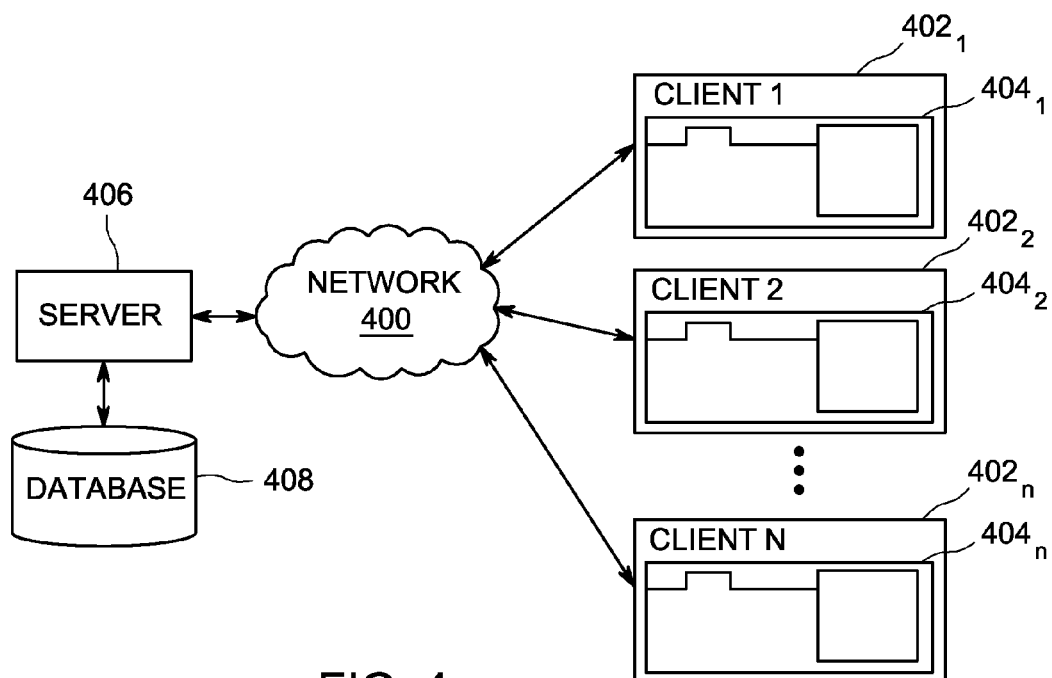
FIG. 4 depicts a functional block diagram of operation of at least one embodiment of the present invention over a network.

FIG. 4 depicts a functional block diagram of operation of the present invention over a network 400. Different users of the system launch browsers $402_{1...n}$ to enable clients $404_{1...n}$. The browsers $402_{1...n}$ send TCP/IP requests over the network 400 to a server 406. In an exemplary embodiment, the server is one of an application server, a web-server and the like. In an exemplary embodiment, the application server is a Java 2 Enterprise Edition (j2ee) compliant application server. The server 406 communicates with the database 408 to send back client views to the clients $404_{1...n}$. Users are able to login to view their task-list, offer feedback on artifacts, relationships and explanations, and create artifacts themselves, affecting other's relevant artifacts through clients 1 . . . n through the network 400. In an exemplary embodiment, server 406 executes portions of the apparatus 100 (not shown) such as the collaboration module 102, the suggestion module 104, and the grouping module 106 and transmits the user interface 110 to clients $404_{1...n}$.

Figure 5:
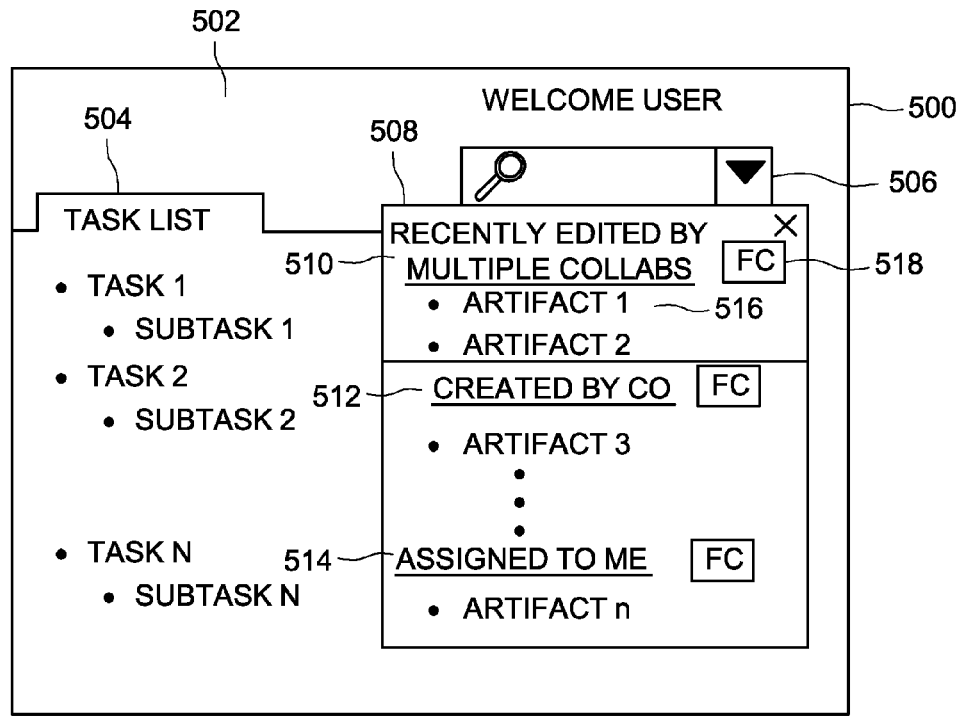
FIG. 5 depicts an illustration of a client view of the resultant display of the apparatus in FIG. 1.

FIG. 5 depicts an illustration of an exemplary client view of the resultant display of the apparatus 100 of FIG. 1, as transmitted over the network 400 by the server 406 as depicted in FIG. 4. Upon logging in, a user launches there browser 500 to display a client view 502. In the client view 502, a user is greeted and shown their task list 504. The task list may be a series of meetings for the week, to-do items, deadlines and the like. The user is able to search the collaborative environment using search bar 506 for various artifacts, tasks, users and the like. The user is also presented with suggested relevant artifacts in a list 508. The list comprises groups 510, 512 and 514. The explanation 510 is "Recently Edited by Multiple Collaborators"—an explanation grouping showing artifacts recently edited by a user's close collaborators, inferred by the collaboration module 102 of FIG. 1. Artifact 516 is suggested as a relevant artifact by the suggestion module 104 of FIG. 1. The presentation of the artifacts into group explanations is performed by the grouping module 106 of FIG. 1. Users are also given feedback controls 518 for each group as well as for each specific explanation for why an artifact is suggested (not shown). In this manner, a user influences the importance of certain close collaborators and the collaboration events they perform, thus impacting the outcome of how often artifacts relating to these events/collaborators appear in their relevant artifact list. The feedback module 108 controls this behavior and couples with a database 112 of FIG. 1 to store and retrieve relevance score information, user information, task information and the like.

Figure 6:
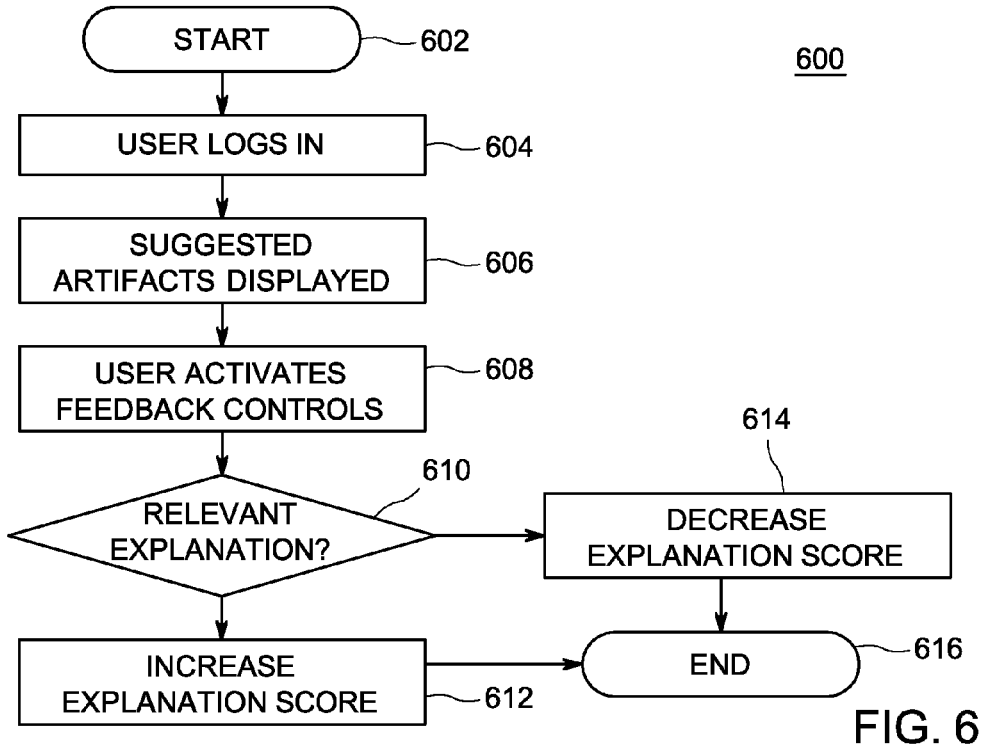
FIG. 6 depicts a flow diagram for a method 600 for overall operation of the use of the apparatus in FIG. 1 according to an exemplary embodiment of the present invention.

FIG. 6 depicts a flow diagram for a method 600 for overall operation of the use of the apparatus 100 of FIG. 1 according to an exemplary embodiment of the present invention. The method begins at step 602 and proceeds to step 604. At step 604, a user logs into the collaborative system to view their task-list and to search for artifacts. Based on the collaboration module 102, close collaborators are slowly created over time for each user and are changing over time. At step 606, using the current set of close collaborators, suggested artifacts are grouped and displayed using explanations. At step 608, a user gives feedback on one of the explanations, the artifacts, and the close collaborators, so that future suggested artifact lists are modified according to the relevancy score of an explanation, collaborator, and the like. If the group is relevant to the user at step 610, then the user's feedback increases the explanation's relevancy score at step 612. If the explanation is not relevant to the user at step 610, the user's feedback decreases the explanation's relevancy score at step 614. The method ends at step 616.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for suggesting one or more relevant artifacts from among a plurality of artifacts in a collaborative environment having a plurality of users, comprising:
    inferring, by a collaboration module executed by a processor, a group of close collaborators from among the plurality of users for a current user based upon interaction of the users with each other and the plurality of artifacts, wherein interaction amongst users creates collaboration events involving particular artifacts created, accessed, or marked by the current user or one of the group of close collaborators;
    determining, by a suggestion module executed by a processor and coupled to the collaboration module, the suggested one or more relevant artifacts based on at least one or more patterns of collaboration events of the group of close collaborators with respect to the artifacts, user feedback, and organizational rules;
    presenting a list of the suggested one or more relevant artifacts to the current user in a plurality of groups of textual explanation, each of the plurality of groups of textual explanation having a general textual explanation that applies to all artifacts in that group and each of the suggested one or more relevant artifacts in that group having a specific textual explanation comprising at least one reason each of the suggested one or more relevant artifacts in that group is suggested to the user by the suggestion module; and
    offering feedback controls for allowing the current user to vary the relevancy of the suggested one or more relevant artifacts, groups and close collaborators by providing interactive feedback controls.

2. The method of claim 1 where the inferring is based on a set of defined relationships among the plurality of users.

3. The method of claim 2, wherein each relationship of the set of defined relationships corresponds to a type from among a set of relationship types, the set comprising at least one of manager/subordinate, creator/consumer, colleague, group membership, or collaborator sender/receiver.

4. The method of claim 1 where an interaction pattern comprises a sequence of collaboration events, a time separating the sequence of collaboration events, and relationships between users associated with the collaboration events.

5. The method of claim 2 further comprising updating the set of defined relationships over time based on the collaborative events of the current user and other users of the collaborative environment.

6. The method of claim 1 where each explanation further comprises at least one of the group of close collaborators or a description of the patterns of collaboration events, associated with the artifacts in the plurality of groups of textual explanation.

7. The method of claim 1 wherein presenting the suggested one or more relevant artifacts further includes presenting a specific explanation of relevance for each of the suggested one or more relevant artifacts in at least one of the groups that is distinct from the general textual explanation associated with the group.

8. The method of claim 1 wherein the collaboration events comprise any event in the collaboration environment, comprising at least one of transmission of a message among the plurality of users, electronically sharing an artifact among the plurality of users, modifying, delegating, viewing or creating an artifact by the plurality of users.

9. The method of claim 4 wherein determining the suggested one or more relevant artifacts comprises scoring the artifacts based on one or more of a relationship between the current user and the group of close collaborators involved in the collaboration events, the interaction pattern associated with the artifact, and the feedback from the current user.

10. The method of claim 9 wherein each of the interaction patterns has a corresponding type and the scoring is based on the corresponding type of the interaction patterns with respect to each of the artifacts.

11. The method of claim 10 wherein the corresponding type of each of the interaction patterns is selected from a set of interaction types including one or more of: creating, modifying, deleting or delegating one or more of the artifacts.

12. The method of claim 11, where the corresponding type of each of the interaction patterns is selected from a set of interaction types, and the set of interaction types is determined or modified through a machine learning algorithm.

13. The method of claim 9, wherein the scoring is further based on a total number of close collaborators in the group of close collaborators who are involved in the interaction patterns with respect to each of the artifacts.

14. An apparatus for suggesting one or more relevant artifacts from a plurality of artifacts in a collaborative environment having a plurality of users, comprising:
    a collaboration module, executed by a processor, for inferring, based on at least one collaboration event, a group of close collaborators from among the plurality of users for a current user based upon interaction of the users with each other and the plurality of artifacts, wherein interaction amongst users creates collaboration events involving particular artifacts created, accessed, or marked by the current user or one of the group of close collaborators;
    a suggestion module, executed by the processor and coupled to the collaborator module, for determining the suggested one or more relevant artifacts based on at least one or more patterns of collaboration events with respect to the artifacts, user feedback and organizational rules; and
    a grouping module, executed by the processor and coupled to the suggestion module and the collaboration module, for presenting a list of the suggested one or more relevant artifacts to the current user in a plurality of groups of textual explanation, each of the plurality of groups of textual explanation having a general textual explanation that applies to all artifacts in that group and each of the suggested one or more relevant artifacts in that group having a specific textual explanation comprising at least one reason the suggested relevant artifacts in that group is suggested to the user by the suggestion module; and
    a feedback module, executed by the processor and coupled to the suggestion module, that offers feedback controls for allowing the current user to vary the relevancy of the suggested one or more relevant artifacts, groups and close collaborators by providing interactive feedback controls.

15. A computer-implemented method for suggesting one or more relevant artifacts from among a plurality of artifacts in an electronic repository accessible to a plurality of computer users, comprising:
    inferring, by a collaboration module executed by a processor, a group of predictive users from among the plurality of computer users for a current user based upon at least interaction of the group of predictive users with each other and the plurality of artifacts, user feedback and organizational rules, wherein interaction amongst users creates collaboration events involving particular artifacts created, accessed, or marked by the current user or one of the group of predictive users;

identifying, by a collaboration module executed by the processor, one or more interaction patterns by the group of predictive users with respect to the artifacts;

determining a type of relationship between each of the predictive users and the current user, from among a plurality of different relationship types;

associating a type of interaction with each of the interaction patterns, from among a plurality of different interaction types;

determining the suggested one or more relevant artifacts based on the interaction type and the relationship type associated with each of the interaction patterns by the predictive users with respect to the artifacts;

presenting a list of the suggested one or more relevant artifacts to the current user in a plurality of groups of textual explanations, each of the plurality of groups of textual explanation having a general textual explanation that applies to all artifacts in that group and each of the suggested one or more relevant artifacts in that group having a specific textual explanation comprising at least one reason the suggested one or more relevant artifacts in that group is suggested to the current user; and offering feedback controls for allowing the current user to vary the relevancy of the suggested one or more relevant artifacts, groups and close collaborators by providing interactive feedback controls.

16. A computer implemented method for suggesting one or more relevant artifacts from among a plurality of artifacts in a collaborative environment having a plurality of users, comprising:

inferring, by a collaboration module executed by a processor, a group of close collaborators from among the plurality of users for a current user based upon at least interaction of the users with each other and the plurality of artifacts, user feedback and organizational rules, wherein interaction amongst users creates collaboration events involving particular artifacts created, accessed, or marked by the current user or one of the group of close collaborators;

determining, by a suggestion module executed by a processor and coupled to the collaboration module, the suggested one or more relevant artifacts by scoring the artifacts based on one or more interaction patterns, relationships between the user and the group of close collaborators, and feedback from the user, wherein an interaction pattern comprises a sequence of collaboration events, a time separating the sequence of collaboration events, and relationships between users associated with the collaboration events;

presenting a list of the suggested one or more relevant artifacts to the current user in a plurality of groups of textual explanation, each of the plurality of groups of textual explanation having a general textual explanation that applies to all artifacts in that group and each of the suggested one or more relevant artifacts in that group having a specific textual explanation comprising at least one reason each of the suggested one or more relevant artifacts in that group is suggested to the user by the suggestion module; and offering feedback controls for allowing the current user to vary the relevancy of suggested artifacts, groups and close collaborators by providing interactive feedback controls.

* * * * *